Patented Jan. 2, 1934

1,941,474

UNITED STATES PATENT OFFICE 1,941,474

PLASTIC OR COATING COMPOSITION

Alphons O. Jaeger, Mount Lebanon, Pa., assignor to The Selden Company, Pittsburgh, Pa., a corporation of Delaware No Drawing. Application May 29, 1928, Serial No. 281,593. Renewed May 16, 1933

4 Claims. (Cl. 106—22)

This invention relates to compositions for use in plastics or for preparing coats or films. More particularly the invention relates to plasticizers, softeners and the like for such products.

In the past it has been necessary to add plasticizers to various plastic compositions and coating compositions, notably those containing artificial resins of the thermoplastic type, for example phenol-aldehyde resins and phenol-ketone resins, such as "Bakelite", phenol-furfural resins, aldehyde-urea resins, polybasic acid-polyhydricalcohol resins of the glycerol phthalate type and other compositions such as polymerization products of cumarone and indene, styrol, itaconic acid, and the like, together with sulfur resins, resins prepared from aromatic amines, casein plastics and the like. Many of these products have been unsatisfactory because in the case of some plastic compositions the resultant product is brittle or lacks flexibility or machining qualities and in the case of coating compositions which are dissolved in solvents the complete evaporation of the solvents leaves films which are brittle and tend to crack or peel. A class of compounds called softeners have been used to obviate this, among the most important softeners being high boiling esters, such as those of phthalic acid, certain high boiling organic compounds, such as various aromatic sulphonamides, and the like. Some of these products are very satisfactory but many have not achieved great commercial success because of excessive costs. Plastic and coating compositions using natural resins, such as shellac and the like have also been plasticized.

The present invention relates to plastic compositions and compositions for forming coatings in which a new class of compounds are used as softeners, namely, the reduction products of phthalic anhydride, the phthalids. Phthalid is a soft solid melting at 83° C. and boiling at 290° C. It is substantially inert, soluble in most of the solvents used and can be readily incorporated with plastic compositions or coating compositions. It does not evaporate, withstands the temperatures necessary for molding and endows the final product with the desired plasticity and workability. Where somewhat more fluid compounds are required the various hydrogenated phthalids, such as the tetra- and particularly the hexahydrophthalids may be used. Thus hexahydrophthalid is a colorless, odorless, heavy oil having a boiling point of 134–138° C. at 25 m. m. pressure and can be used with excellent effect in many plastic compositions and particularly coating compositions, such as, for example, glycerol phthalate lacquers, and the like.

Hydrogenated phthalids may be produced by catalytic vapor phase hydrogenation of phthalic anhydride in the presence of suitable catalysts or liquid phase hydrogenation of phthalic anhydride at ordinary or superatmospheric pressure, and it is sometimes desirable to produce mixtures of phthalids and their hydrogenated products or mixtures of the various hydrogenated products in order to produce plasticizers having intermediate characteristics between those of phthalid and hexahydrophthalid. Such mixtures either produced directly by catalysis or prepared by blending the pure ingredients are included in the present invention under the expression "phthalid substance". The phthalids which are internal esters of orthooxymethylbenzoic acid or its derivatives vary in their physical properties depending on the degree of hydrogenation but they all possess the desirable softening properties, are non-corrosive, relatively non-volatile and satisfactorily withstand the temperatures required in molding plastics.

Another important class of phthalid substances are the alkyl, alkylidene, and aryl substituted phthalids. Thus for example, one or both hydrogen atoms attached to the oxymethyl carbon may be substituted for alkyl or aryl phthalids and both hydrogen atoms can be substituted to form alkylidene phthalids; the general formulæ are as follows:

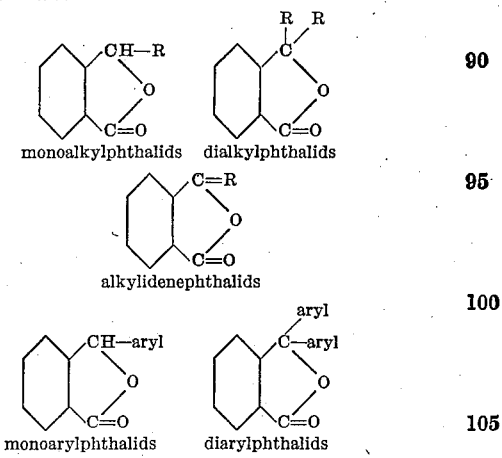

monoalkylphthalids  dialkylphthalids alkylidenephthalids monoarylphthalids  diarylphthalids The substituted di- tetra- and hexahydrophthalids are also usable, and constitute effective plasticizers. A few substituted phthalids are the monoethyl- propyl- butyl- and isobutylphthalids, and hydrogenated phthalids possessing in general these products are low melting solids or oils with a pleasant celery odor. Alkylidenephthalids, such as ethylidene and propylidenephthalids, and the like, are of importance in certain phenol resins, and it seems probable that a certain amount of resinifying reaction takes place between the alkylidene double bond and the phenol, since this double bond is of course of aldehydic character. It is obviously impossible to definitely determine just what takes place in a plastic composition which forms an infusible, insoluble end product. Examples of dialkylphthalids and hydrogenated phthalids are the diethyl, dipropyl, dibutyl and diisobutylphthalids and hydrogenated phthalids. Arylphthalids such as phenylphthalids or diphenylphthalids are also very important, especially where extremely high boiling, normally solid plasticizers are desired, as in the case of some molding compositions.

The whole group of phthalid substances is characterized by softness and plasticity, relatively low vapor pressure and desirable resistance to high temperatures. Many of the products are colorless solids or oils, either odorless or possessing an agreeable odor, such as the monoalkylphthalids; some are colored, being yellow, yellow brown or red brown oils or solids. All of the members are non-corrosive and do not evolve poisonous vapors, and possess very advantageous properties for use as plasticizers.

It should be understood that the effect of the phthalids as plasticizers is primarily physical. There is every reason to believe from their behavior that usually no chemical compounds are formed between the phthalids and the plastic compositions in which they are used although of course this cannot be determined with complete accuracy in every case as the final products obtained for molding compositions are not of a character which permit of ready chemical analysis.

The following examples will illustrate the application of the invention to a few of the immense number of plastic compositions and coating compositions which are of importance in industry today. It is understood that the invention is not limited to the details set forth in these specific examples which are merely illustrations of a few typical embodiments.

*Example 1*

85 parts of glycerol phthalate resin, preferably freshly prepared and fairly hard but not infusible, are mixed with 15 parts of phthalid and heated to 150° C. accompanied by stirring until a homogeneous mixture is obtained. If desired, fillers may be incorporated and the product can be molded preferably under pressure, preferably at 150-250° C., to form an infusible product. Heating at a lower temperature, such as 80-150° C., can also be carried out at a lower pressure but a longer time is necessary.

*Example 2*

Phenol and formaldehyde are combined by well known methods to form a condensation product which can be rendered infusible by heating. The condensation is preferably carried out in the absence of fixed alkalis, water is removed, and 10-20% of phthalid or monoethyl phthalid, or ethylidene phthalid is homogeneously incorporated with the condensation product, heat being used, if necessary, to render the former sufficiently fluid to permit thorough mixture. The plasticized condensation product may be mixed with fillers, if necessary, such as asbestos, wood flour, kieselguhr and the like, and can then be hot molded to set to an infusible product.

*Example 3*

A fluid condensation product of phenol and formaldehyde is prepared and about 20-25% of hexahydrophthalid is homogeneously incorporated. This product can be used as an enamel or coating, if necessary with the addition of colors, and spreads well while hot on a clean metal surface. It should then be baked for a short time to harden the resin, pressure being applied if necessary. The enamel produced is superior to those prepared from unplasticized phenol and formaldehyde condensation products, and is much more flexible. Its spreading and covering powers are also improved.

*Example 4*

A fusible phenol furfural condensation product is prepared in the usual manner and after removing water and any free alkali which may be present about 12% of a mixture of about 90% phthalid and 10% hydrogenated phthalids is incorporated, the condensation product being sufficiently heated to permit thorough incorporation. Fillers may be added, if desired, and the composition then hardened in the usual manner.

*Example 5*

A formaldehyde-urea resin is prepared in the usual manner and while still in the fusible state 3-10% of hexahydrophthalid or a mixture of hydrogenated phthalids which may contain some unhydrogenated phthalid is added, sufficient heat and agitation being used to permit thorough incorporation. The resin is then hardened in the usual manner.

*Example 6*

A fusible resin prepared by polymerization or condensation of styrol is homogeneously admixed with about 5-8% phthalid and is then hardened in the usual manner.

*Example 7*

A resin prepared by condensation or polymerization of itaconic acid is admixed with about 5-9% of hexahydrophthalid, sufficient heat being used to permit thorough incorporation, and the resin is then hardened in the usual manner.

*Example 8*

A shellac molding composition is prepared and a phthalid substance is added to the amount of about 25% by weight of the shellac. Thorough incorporation is effected by means of heat together with stirring or kneading. The composition then can be readily molded giving a fine surface and being readily workable.

The foregoing examples give a few representative illustrations showing the use of phthalid substances in plastics and lacquers. It has been found that the phthalids and particularly the hydrogenated phthalids are very effective, high boiling plasticizers for a wide range of lacquers, especially brush lacquers. The invention is not limited to the use of particular formulæ.

It should be understood that the expression "phthalid substance" is intended to cover phthalid itself, together with its various hydrogenated products, such as tetra- and hexahydrophthalid and their alkyl, alkylidene, alicyclyl and aryl derivatives.

In the claims, the expression "resinous" is used to cover resins such as shellac and the like, and also the synthetic resinoids which are capable of being hardened by heat; it is not limited to natural resins, but includes the compositions recited on page 1 and similar products.

What is claimed as new is:

1. A plasticized composition comprising a condensation product of a polyhydric alcohol and a polybasic acid and a hydrogenated phthalid substance having the formula

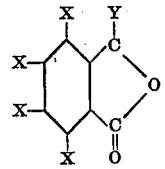

in which at least one X equals $H_2$ and the remaining X's are H or $H_2$ and Y is $H_2$, H-alkyl, dialkyl, H-aryl, diaryl or alkylidine.

2. A plasticized composition comprising a glycerol phthalate resin and a hydrogenated phthalid substance having the formula

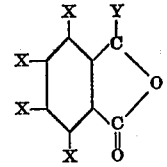

in which at least one X equals $H_2$ and the remaining X's are H or $H_2$ and Y is $H_2$, H-alkyl, dialkyl, H-aryl, diaryl or alkylidine.

3. A coating composition comprising a condensation product of polyhydric alcohol and polybasic acid, at least one volatile solvent therefor and at least one hydrogenated phthalid substance having the formula

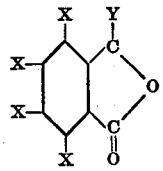

in which at least one X equals $H_2$ and the remaining X's are H or $H_2$ and Y is $H_2$, H-alkyl, dialkyl, H-aryl, diaryl or alkylidine.

4. A coating composition comprising a glycerol phthalate resin, at least one volatile solvent therefor and a hydrogenated phthalid substance having the formula

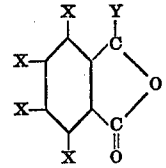

in which at least one X equals $H_2$ and the remaining X's are H or $H_2$ and Y is $H_2$, H-alkyl, dialkyl, H-aryl, diaryl or alkylidine.

ALPHONS O. JAEGER.